Richard H.A. Schoonover
INVENTOR

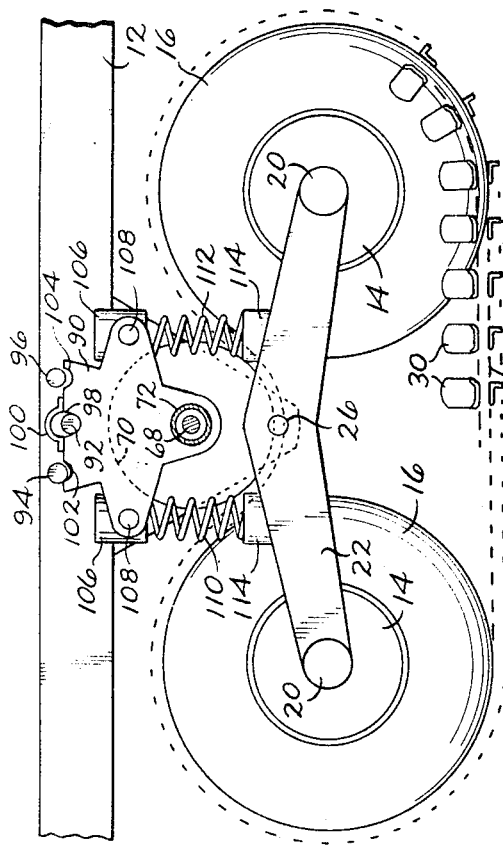
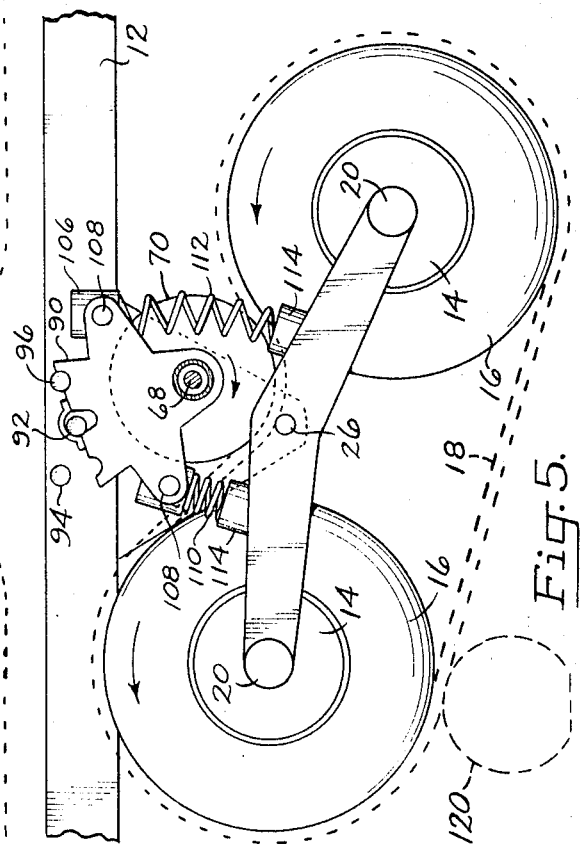
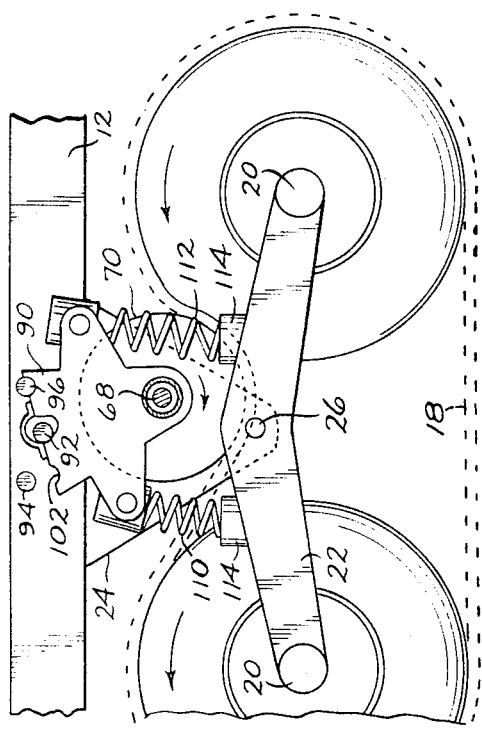

United States Patent Office 3,443,654
Patented May 13, 1969

3,443,654
TRACK-LAYING VEHICLE AND SELF-ENERGIZING TRACK TORQUE CONTROL THEREFOR
Richard H. A. Schoonover, Albany, Oreg., assignor to Katrak Vehicle Company, Albany, Oreg., a corporation of Oregon
Filed Aug. 15, 1967, Ser. No. 660,825
Int. Cl. B62d 55/06
U.S. Cl. 180—9.62     4 Claims

ABSTRACT OF THE DISCLOSURE

A pair of longitudinally spaced track mounting driving wheels are journaled on a walking beam secured to a vehicle frame for pivotal movement on a transverse axis against the resistance of a pair of longitudinally spaced springs seated at one end on the walking beam and at the opposite end on a support member secured to a longitudinally movable differential and driven shaft housing. The support member is secured to the vehicle frame for pivotal movement selectively about each of three longitudinally spaced transverse pivot pins, whereby to permit longitudinal movement of a track drive sprocket on the driven shaft automatically to impose greater downward pressure on the front driving wheel progressively as the driving force of the vehicle increases.

BACKGROUND OF THE INVENTION

This invention relates to track-laying vehicles, and more particularly to a track-laying vehicle having a self-energizing track torque control.

Track-laying vehicles provided heretofore are constructed in such manner that the forward end of the track tends to raise from the ground progressively as the driving force of the vehicle increases. This tendency not only results in decreased traction, but it also progresses to a point at which the track-laying assembly becomes very unstable and tends to overturn in the rearward direction. This tendency to overturn is further enhanced as the vehicle traverses logs and other raised obstructions.

SUMMARY OF THE INVENTION

In its broad concept the track-laying vehicle of the present invention includes a self-energizing track torque control which functions automatically to increase the downward pressure on the front driving wheel of the track-laying assembly progressively as the driving force of the vehicle increases. Thus, driving traction, stability and resistance to overturning increases with the driving force.

It is by means of the foregoing that the principal object of the present invention is achieved, namely to overcome the disadvantages associated with prior track-laying vehicles as discussed hereinbefore.

Another important object of this invention is the provision of a track-laying vehicle of the class described which affords the use of pneumatic tires on the track mounting driving wheels.

A further important object of this invention is the provision of a track-laying vehicle of the class described which is of simplified and rugged construction for economical manufacture and long service life.

The foregoing and other objects and advantages of the present invention will appear from the following detailed description, taken in connection with the accompanying drawings of the preferred embodiment.

BRIEF DESCRIPTION OF THE DRAWINGS

FIG. 3 is a fragmentary sectional view taken on the line 3—3 in FIG. 2 and showing the relative position of components of one of the track-laying assemblies in parked, or no torque condition.

FIG. 4 is a fragmentary sectional view similar to FIG. 3 showing the relative arrangement of components with the track-laying assembly operating in a high torque condition.

FIG. 5 is a fragmentary sectional view similar to FIGS. 3 and 4 showing the relative arrangement of components with the track-laying assembly operating under a condition of high torque and maneuvering over a log.

DESCRIPTION OF THE PREFERRED EMBODIMENT

Figure 2:
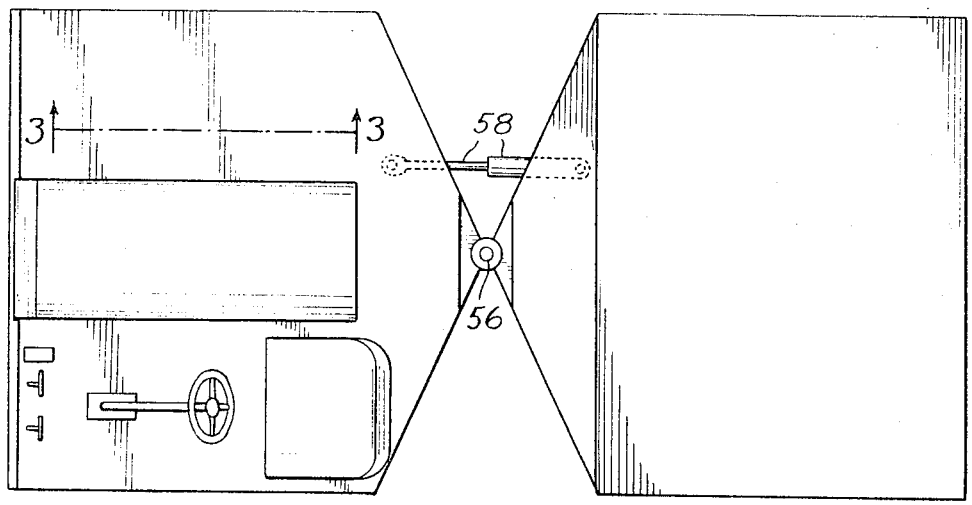
FIG. 2 is a plan view of the assembly illustrated in FIG. 1.
Figure 1:
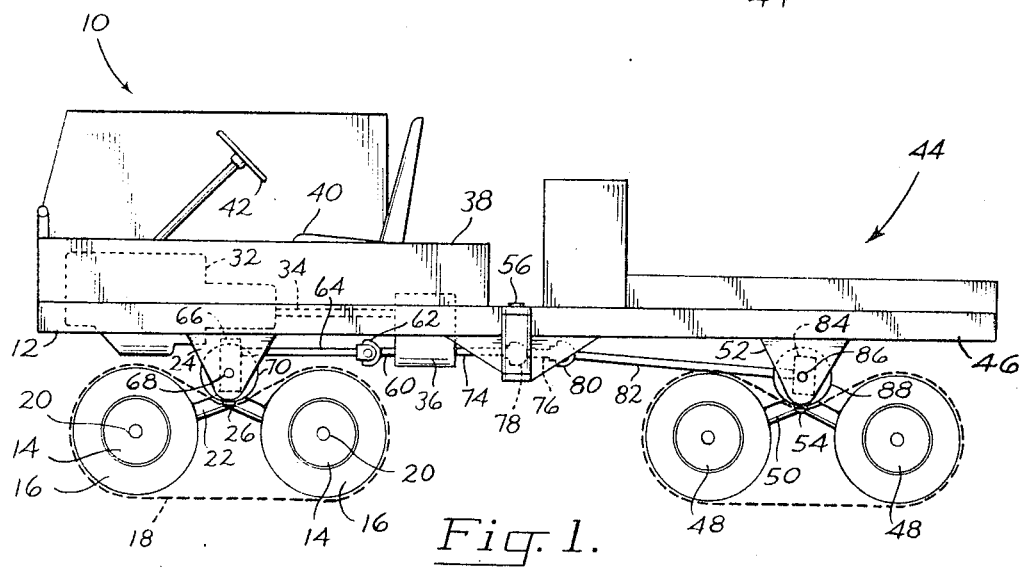
FIG. 1 is a view in side elevation of a tandem type track laying vehicle assembly including self-energizing track torque control embodying the features of the present invention.

In FIGS. 1 and 2 of the drawings there is shown for purposes of illustration a pair of vehicles arranged in tandem. One of the vehicles, for example the forward vehicle 10, includes a frame 12 supported upon a pair of laterally spaced track-laying assemblies. Each assembly includes a pair of longitudinally spaced driving wheels 14 preferably including pneumatic tires 16 mounting an endless track member 18 and journaled on shafts 20 at the opposite ends of a walking beam 22. Intermediate its ends the walking beam is secured to the vehicle frame by means of the depending bracket 24 and transverse pivot pin 26.

The track member 18 comprises a plurality of pivotally interconnected links each of which supports an outwardly projecting ground gripping lug 28 (FIG. 3), in manner well known in the art. Each link also supports a pair of laterally spaced inwardly projecting guide plates 30 which serve to straddle and confine between them the outer peripheral portion of the pneumatic tires. These guide plates thus serve to maintain the endless track member properly aligned on the driving wheels.

The frame 12 supports an internal combustion engine 32 or other suitable source of rotary power, the output shaft 34 of which is connected to conventional clutch and transmission mechanism 36. The frame also supports a body 38 having a driver's compartment including the seat 40 and steering wheel 42.

The rear vehicle 44 includes a frame 46 supported upon laterally spaced pairs of wheels 48. Each pair of wheels is mounted in longitudinally speed relation on opposite ends of a walking beam 50 which is pivotally secured intermediate its ends to the frame through the supporting bracket 52 and pivot pin 54.

The adjacent ends of the vehicle frames are coupled together for relative pivotal movement on a vertical axis, by such means as the connecting pin 56, for steering of the tandem assembly by means of the extensible fluid pressure piston-cylinder unit 58. The coupling also provides for relative rotational displacement of the vehicles on a horizontal longitudinal axis to accommodate movement of the assembly over rough terrain. However, the coupling does not permit relative pivotal movement of the frames on a transverse horizontal axis, and therefore the two frames effectively form a single frame which is substantially rigid throughout its length. Accordingly it is to be understood that the track-laying assembly described hereinafter may be employed on a single vehicle having a single, substantially rigid frame and employed either at the front or rear thereof. Alternatively the vehicle utilizing the track-laying assembly may be coupled to any type of attachment, such as a harvester, harrow, or other farm implement, the only requirement being that the attached assembly not be pivotable on a transverse horizontal axis.

Means is provided for connecting the tracks of both vehicles to a common source of power, to provide simultaneous driving of the tracks of both vehicles. In the embodiment illustrated a drive rod section 60 extends forwardly from the transmission mechanism 36 and is coupled through the universal joint 62 to the drive rod section 64. This section is operatively connected through a differential 66 to each of the transverse driven shafts 68 which mount the driven sprockets 70 of the forward vehicle 10. Since the housing 72 (FIG. 3) for the differential 66 and driven shafts 68 is supported for movement, as explained hereinafter, it will be understood that a conventional spline and universal joint connection (not shown) is provided between the differential 66 and drive rod section 64.

A drive rod section 74 also projects rearwardly from the transmission mechanism 36 and is connected to a drive rod section 76 through a conventional quick-disconnect universal joint 78 which is aligned axially with the vertical pivot 56 of the coupling. The drive rod section 76 is connected through the universal joint 80 to the rearward drive rod section 82. This section, in turn, is operatively connected through a conventional spline and universal joint in the differential 84 which connects the transverse driven shafts 86 for the driven sprockets 88 of the rear vehicle 44.

The track torque control of the present invention is associated with each track drive assembly, there being four such assemblies for the tandem system illustrated. For simplicity, FIGS. 3, 4 and 5 of the drawings illustrate one of the assemblies associated with the forward vehicle.

To the housing 72 is secured a torque control member. In the embodiment illustrated this member comprises driven shaft support plate 90 disposed in a vertical plane which extends in the longitudinal direction of the frame 12. This plate is secured to the frame for pivotal movement at least on one transverse axis above the driven shaft 68. In the preferred embodiment illustrated the plate is mounted for pivotal movement selectively about each of three longitudinally spaced transverse pivot pins 92, 94 and 96 secured to and projecting from the vehicle frame. The middle pivot pin 92 is received freely in an enlarged notch 98 in the plate and is confined against removal therefrom by means of the overlying strap 100. The pivot pins 94 and 96 disposed on opposite sides of the middle pin are received removably in the corresponding notches 102 and 104, respectively, provided in the plate on opposite sides of the middle notch 98.

The plate 90 also supports a pair of longitudinally spaced socket members 106 which are secured to the plate by the transverse pivot pins 108. These socket members confine the upper ends of the elongated coil springs 110 and 112, respectively. The lower ends of the springs are received in sockets 114 provided on the walking beam 22 to opposite sides of the pivot pin 26.

In the neutral position of the assembly illustrated in FIG. 3, the coil springs are preloaded to a desired degree of substantially equal compression, and the transverse axes of the pivot pins 26, 92 and driven shaft 68 are disposed substantially in a common vertical plane. The springs urge the torque control plate 90 resiliently upward, seating the middle pivot pin 92 in the base of the middle notch 98. The outboard pivot pins 94 and 96 are disposed upward and out of seating engagement with the associated notches 102 and 104.

Let it now be assumed that the vehicle is being driven toward the left in FIG. 4 and that a substantial resistance to such movement is being encountered. Accordingly the drive sprocket 70 engaging the endless track member 18 is permitted to move rearward, first by counterclockwise pivoting of the torque control plate 90 about the middle pivot pin 92. When the rearward pivot pin 96 engages its associated notch 104, further counterclockwise pivoting of the plate occurs about the rearward pivot pin.

Counterclockwise pivoting of the plate effects extension of the rearward spring 112 and compression of the forward spring 110, as compared with the neutral position illustrated in FIG. 3. Accordingly, greater downward pressure is exerted on the forward driving wheel, and this pressure increases in proportion to the resistance to forward movement of the vehicle and hence the driving force of the vehicle.

The advantage of being able to use pneumatic tires on the driving wheels is illustrated in FIG. 4. The resilient nature of the pneumatic tires enables the drive sprocket 70 to move farther rearward than would be possible with non-resilient wheels, thereby affording a greater degree of counterclockwise pivoting of the plate 90 and a correspondingly greater degree of compression on the forward coil spring 110.

It will be understood that when the vehicle is driven in a reverse direction from that indicated in FIG. 4, the torque control plate 90 will pivot clockwise first about the middle pin 92 and then about the left hand pin 96, to move the sprocket 70 rearward toward the left hand driving wheel. This action compresses the now forward spring 112 and imposes greater downward pressure on the forward right hand driving wheel.

Referring now to FIG. 5 of the drawings, let it be assumed that the vehicle is being driven toward the left, under a high torque condition similar to that illustrated in FIG. 4, and that the front driving wheel then engages a log or similar obstruction 120. As the front driving wheel elevates to traverse the log, the walking beam 22 pivots clockwise about its pivot pin 26. The rear driving wheel thus is moved downward relative to the sprocket 70, allowing the latter to move still farther rearward by further counterclockwise pivoting of the torque control plate 90. This further counterclockwise rotation of the plate compresses the forward spring 110 still further, thereby further increasing the downward pressure on the front driving wheel.

Thus, the present invention provides simplified and rugged means by which to control track torque automatically as required to increase the downward pressure on the front driving wheel of a track-laying assembly progressively as the driving force of the vehicle increases. It is by this means that maximum driving traction and vehicle stability is assured under all conditions of operation.

It will be apparent to those skilled in the art that various changes may be made in the size, shape, number and arrangement of parts described hereinbefore. For example, the pivot pins 92, 94 and 96 may be secured to the torque control plate 90 and received freely in appropriately enlarged openings in the vehicle frame 12. Although the plate may be arranged to pivot about one pin only, the illustrated provision of three pivot pins is preferred since it provides a greater magnitude of longitudinal movement of the sprocket relative to the rearward driving wheel. Each driven shaft may be connected to a separate hydraulic or electric drive motor instead of to the engine 32 through the drive assembly illustrated. The foregoing and other changes may be made, as desired.

Having now described my invention and the manner in which it may be used, I claim:

1. A track-laying vehicle comprising:
 (a) a vehicle frame,
 (b) a driven shaft disposed transversely of the frame,
 (c) driven shaft support means,
 (d) pivot means interengaging the driven shaft support means and frame for pivoting the support means on an axis vertically spaced from the driven shaft transversely of the frame,
 (e) walking beam means secured intermediate its ends to the frame for pivotal movement on a transverse axis, (f) a pair of longitudinally spaced driving wheels supported one on each end of the walking beam means, (g) an endless track member mounted on the driving wheels, (h) track driving sprocket means secured to the driven shaft and engaging the outer surface of the track member intermediate the driving wheels, and (i) resilient means interengaging the walking beam means and driven shaft support means on opposite sides of the walking beam pivot axis.

2. The track-laying vehicle of claim 1 wherein the pivot means comprises three longitudinally spaced pivots for pivoting the driven shaft support means selectively on each of three axes transversely of the frame, the pivots being arranged to accommodate limited vertical displacement of the driven shaft support means relative to the frame.

3. The track-laying vehicle of claim 1 wherein the resilient means comprises elongated coil springs extending between the walking beam means and driven shaft support means.

4. The track-laying vehicle of claim 1 wherein the driving wheels include pneumatic tires.

References Cited

UNITED STATES PATENTS

| 1,516,578 | 11/1924 | Platt | 305—20 X |
| 2,496,136 | 1/1950 | Smith | 305—29 X |
| 2,878,883 | 3/1959 | France | 180—9.46 |
| 3,107,924 | 10/1963 | Cushman | 205—20 X |

FOREIGN PATENTS

| 895,931 | 4/1944 | France. |

RICHARD J. JOHNSON, *Primary Examiner.*

U.S. Cl. X.R.

180—9.44; 305—20